(12) United States Patent
Jung et al.

(10) Patent No.: US 10,054,987 B2
(45) Date of Patent: Aug. 21, 2018

(54) DISPLAY MODULE AND METHOD OF CONTROLLING SAME

(71) Applicant: SAMSUNG DISPLAY CO., LTD., Yongin-si, Gyeonggi-do (KR)

(72) Inventors: Sunggon Jung, Suwon-si (KR); Heesoo Yoo, Seoul (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 121 days.

(21) Appl. No.: 14/959,530

(22) Filed: Dec. 4, 2015

(65) Prior Publication Data

US 2016/0274676 A1 Sep. 22, 2016

(30) Foreign Application Priority Data

Mar. 20, 2015 (KR) ........................ 10-2015-0039187

(51) Int. Cl.
| | |
|---|---|
| *G06F 1/16* | (2006.01) |
| *H04M 1/02* | (2006.01) |
| *G06F 3/01* | (2006.01) |
| *G06F 3/0488* | (2013.01) |
| *G06F 3/0484* | (2013.01) |
| *G06F 3/041* | (2006.01) |

(52) U.S. Cl.
CPC .......... *G06F 1/1652* (2013.01); *G06F 1/1616* (2013.01); *G06F 1/1675* (2013.01); *G06F 1/1679* (2013.01); *G06F 3/013* (2013.01); *G06F 3/0416* (2013.01); *G06F 3/04842* (2013.01); *G06F 3/04883* (2013.01); *H04M 1/0268* (2013.01); *H04M 2250/22* (2013.01)

(58) Field of Classification Search
CPC .... G06F 1/1652; G06F 1/1679; G06F 1/1616; G06F 1/1675; G06F 3/013; G06F 3/04883; G06F 3/04842; G06F 3/0416; H04M 1/0268; H04M 2250/22
See application file for complete search history.

(56) References Cited

U.S. PATENT DOCUMENTS

| | | | | |
|---|---|---|---|---|
| 2007/0157089 A1* | 7/2007 | Van Os | ............... | G06F 3/04817 715/702 |
| 2009/0005011 A1* | 1/2009 | Christie | ............... | G06Q 10/107 455/412.2 |
| 2010/0011291 A1* | 1/2010 | Nurmi | ................... | G06F 3/0414 715/702 |
| 2011/0298691 A1* | 12/2011 | DeLuca | ................. | G06F 21/36 345/1.3 |
| 2012/0075116 A1* | 3/2012 | Grassle | ................. | G06Q 50/22 340/870.07 |

(Continued)

FOREIGN PATENT DOCUMENTS

| | | |
|---|---|---|
| KR | 10-0478108 B1 | 3/2005 |
| KR | 10-2005-0107465 A | 11/2005 |

(Continued)

*Primary Examiner* — Mihir K Rayan
(74) *Attorney, Agent, or Firm* — Lee & Morse, P.C.

(57) ABSTRACT

A display module includes a display part and a bending part. The display part includes a display region for displaying an image and at least one bending guide line. The bending part bends the display part along a bending line which corresponds to the bending guide line, when the bending guide line is selected based on an input signal.

19 Claims, 16 Drawing Sheets

(56) References Cited

U.S. PATENT DOCUMENTS

2012/0075166 A1*  3/2012  Marti .................... G06F 3/011
                                                    345/1.1
2013/0265262 A1* 10/2013  Jung ..................... G06F 3/041
                                                    345/173
2014/0281954 A1*  9/2014  Ullrich ................ G06F 15/0291
                                                    715/702

FOREIGN PATENT DOCUMENTS

| KR | 10-2010-0103095 A | 9/2010 |
|----|-------------------|--------|
| KR | 10-2012-0056512 A | 6/2012 |
| KR | 10-2012-0101359 A | 6/2012 |
| KR | 10-1267355 B1 | 5/2013 |
| KR | 10-1291948 B1 | 7/2013 |
| KR | 10-2013-0113901 A | 10/2013 |
| KR | 10-1333928 B1 | 11/2013 |
| KR | 10-2013-0143160 A | 12/2013 |
| KR | 10-2014-0003132 A | 1/2014 |
| KR | 10-2014-0016082 A | 2/2014 |

* cited by examiner

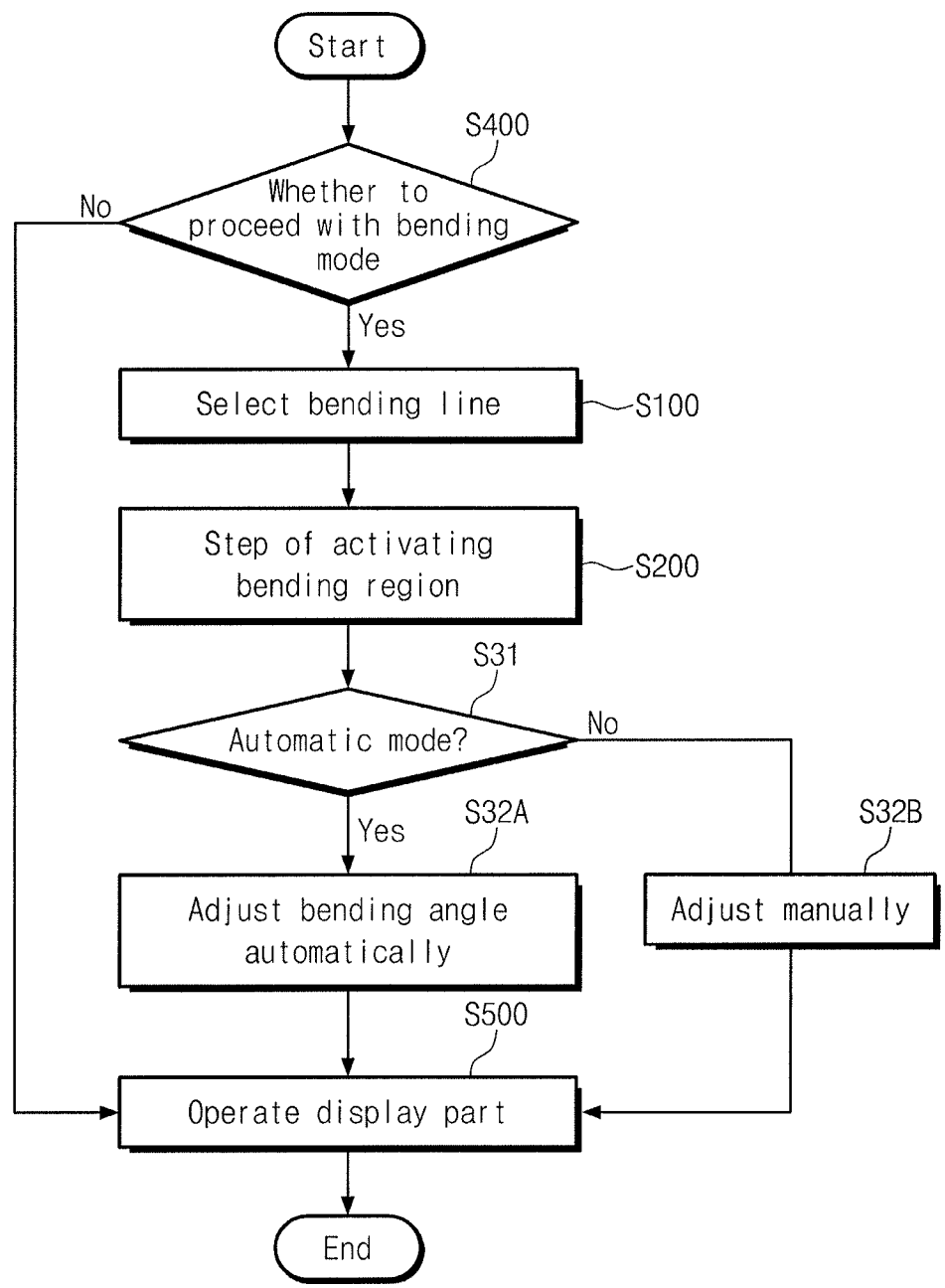

DISPLAY MODULE AND METHOD OF CONTROLLING SAME

CROSS-REFERENCE TO RELATED APPLICATION

Korean Patent Application No. 10-2015-0039187, filed on Mar. 20, 2015, and entitled, "Display Module and Method of Controlling Same," is incorporated by reference herein in its entirety.

BACKGROUND

1. Field

One or more embodiments described herein relate to a display module and a method for controlling a display module.

2. Description of the Related Art

Flexible display modules may fold, roll, bend, or otherwise change shape like paper. These attributes make them convenient to use and easy to carry.

SUMMARY

In accordance with one or more embodiments, a display module includes a display panel including a display region to display an image and at least one bending guide line; and a bender to bend the display panel along a bending line, wherein the bending line is to correspond to the bending guide line when the bending guide line is selected based on an input signal. The input signal may be a touch input signal to be generated based on a touch on the display panel. The touch input signal may be generated when the touch is on one point of the selected bending guide line. The touch input signal may be generated based on a continuous touch applied between at least two points in the selected bending guide line.

The touch may be a dragging touch applied along a line connecting the at least two points. The at least two points may include a first point and a second point, a bending direction of the display panel may be a first direction when a direction of the touch input is from a first point to a second point, the bending direction of the display panel may be a second direction when the direction of the touch input is from the second point to the first point, and the first direction may be opposite to the second direction.

The display panel may display a plurality of bending guide lines, and when the bender is to bend the display panel, the bending guide lines except for the selected bending guide line may not be displayed. The bending guide lines may include at least two bending guide lines extending in different directions crossing each other. The bender may include an electro-active material.

The display module may include an accommodation area to accommodate the display panel and the bender and to expose the display region. The bender may accommodate the display panel, and the bender may include at least one bending axis corresponding to the at least one bending guide line. The display module may include a detector to detect a position of a subject, wherein the display panel is to be bent at a bending angle corresponding to the position of the subject. The detector may include a camera or an infrared detector.

In accordance with one or more other embodiments, a method for controlling a display module includes selecting a bending guide line in a display region as a bending line; activating a bending region that overlaps the bending line; and bending the display module along the bending line. Selecting the bending guide line may be performed based on a touch signal. The touch signal may be a dragging touch signal.

Activating the bending region may include adjusting a bending angle of the display module. Adjusting the bending angle may include turning on a detector to detect position information of a subject; bending the display module based on the position information; and setting the bending angle so that when the position information on the subject corresponds to a predetermined value, bending of the display module is completed. The predetermined value may be set to position the subject at a center of a bent portion of the display region. The bending angle may be about 90 degrees or less.

BRIEF DESCRIPTION OF THE DRAWINGS

Features will become apparent to those of ordinary skill in the art by describing in detail exemplary embodiments with reference to the attached drawings in which:

FIG. 8 illustrates an embodiment of a method for controlling a display module.

DETAILED DESCRIPTION

Figure 1A:
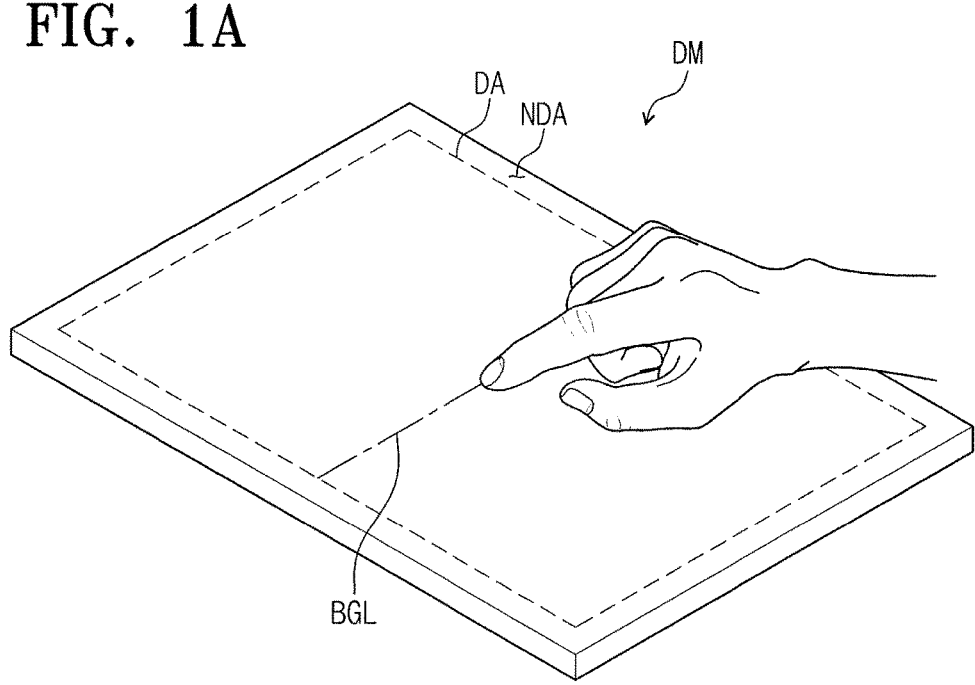
FIGS. 1A and 1B illustrate an embodiment of a display module.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1B:
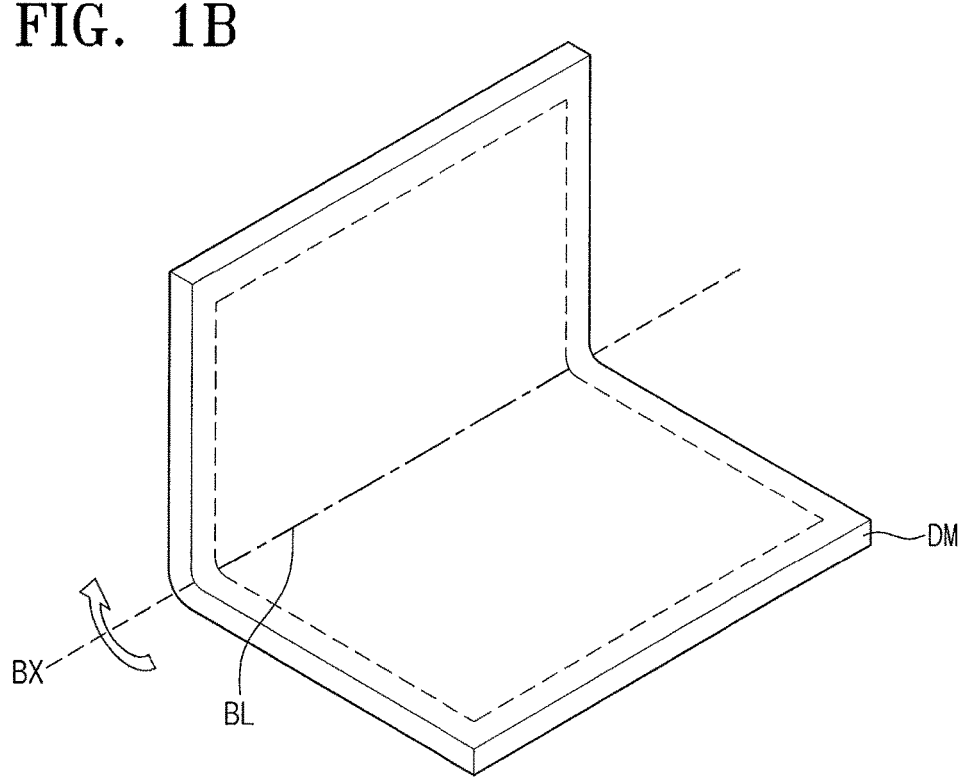

FIG. 1A illustrates a display module DM in planar mode, and FIG. 1B illustrates the display module DM in bending mode. The display module DM includes a display region DA and a non-display region NDA. The display region DA display images based on electrical signals, and a user may enter and/or confirm information through images displayed in the display region DA. The non-display region NDA is adjacent to the display region DA and may have, for example, a frame shape surrounding the display region DA.

As illustrated in FIG. 1A, the display module DM displays at least one bending guide line BGL in planar mode. The bending guide line BGL may be displayed in the display region DA as a part of or overlaid on an image. The bending guide line BGL may be, for example, a candidate line which may become an actual bending line BL corresponding to a bending axis BX of the display module DM. In another embodiment, the display module DM may include a plurality of bending guide lines BGL. A user may select any one of the bending guide line BGL in the display region DA, and the selection may be provided to the display module DM as an input signal.

The input signal may be provided in various forms. For example, the input signal may be a touch signal of a user, e.g., the input signal may be generated when a user touches one of the bending guide lines BGL. The input signal may also be generated when a user contacts a bending guide line BGL using an electronic pen or stylus, when the user performs an action that generates a pressure signal, and/or designates the bending guide line using a button, icon, or other function of the display module.

The display module DM may have improved intuition because a bending line may be selected through a simple touch input. Moreover, a user may easily bend the display module DM by momentarily touching a desired bending guide line from among the displayed bending guide lines, or by performing a dragging operation along a bending guide line. The selected bending guide line BGL corresponds to bending line BL. Thus, by selecting a bending guide line BGL, a corresponding bending line BL is effectively selected. When a bending guide line BGL is selected, the corresponding bending line BL may or may not be displayed in the display region DA.

As illustrated in FIG. 1B, the display module DM bends about a bending axis BX in bending mode. The bending axis BX extends in a predetermined direction that coincides with the bending line BL. The display module DM may, for example, bend or fold about the bending line BL.

The display module DM, thus, may bend along the bending line BL selected by a user. Accordingly, the display module DM may have a bent or folded shape that is arbitrarily controllable by (e.g., at the choice or selection of) a user, e.g., in accordance with the preference of a user. As a result, convenience of use of the display module DM may be improved. Also since the display module DM may be used for various applications, applicability of the display module DM may be improved.

Figure 2:
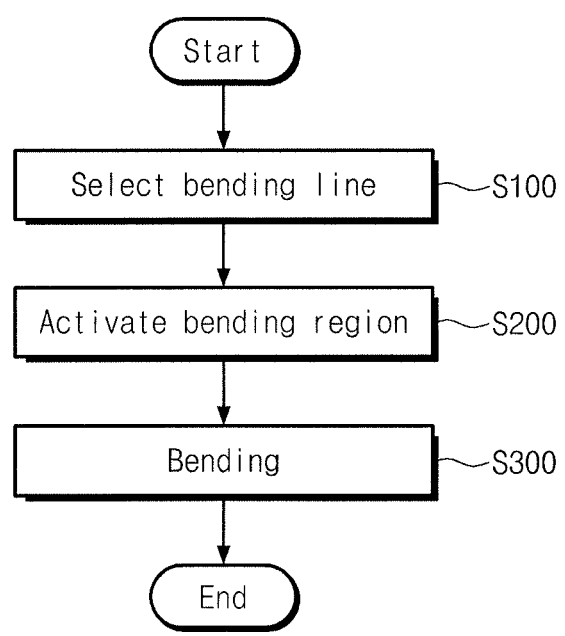
FIG. 2 illustrates an embodiment of a method for controlling a display module.

FIG. 2 illustrating an embodiment of a method for controlling a display module, which, for example, may be the display module DM in FIG. 1. The method includes selecting a bending line for the display module (S100), activating a bending region or line on the display module (S200), and bending the display module along the bending region or line (S300).

Figure 3A:
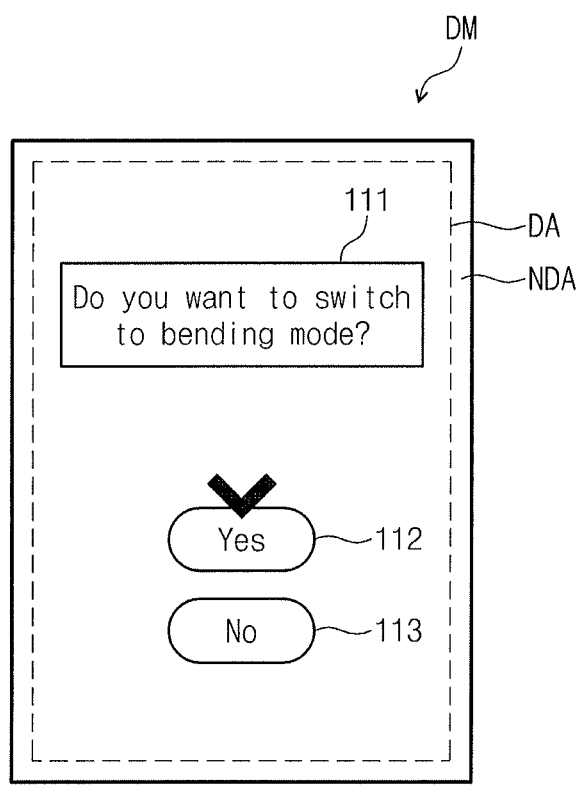
FIGS. 3A-3D illustrate different stages of the method in FIG. 2.

FIGS. 3A to 3D show different operations of the method performed on the display module DM. Referring to FIG. 3A, selecting a bending line (S100) may be performed, for example, in accordance with operations that include displaying a guide screen in the display region DA which gives a user a choice as to whether to enter the bending mode. The guide screen may include, for example, text, an icon, and/or graphics 111 informing the user of the choice to enter the bending mode. The guide screen may also include selectable areas 112 and 113 corresponding to different choices (e.g., Yes, No) for entering the bending mode.

Figure 3B:
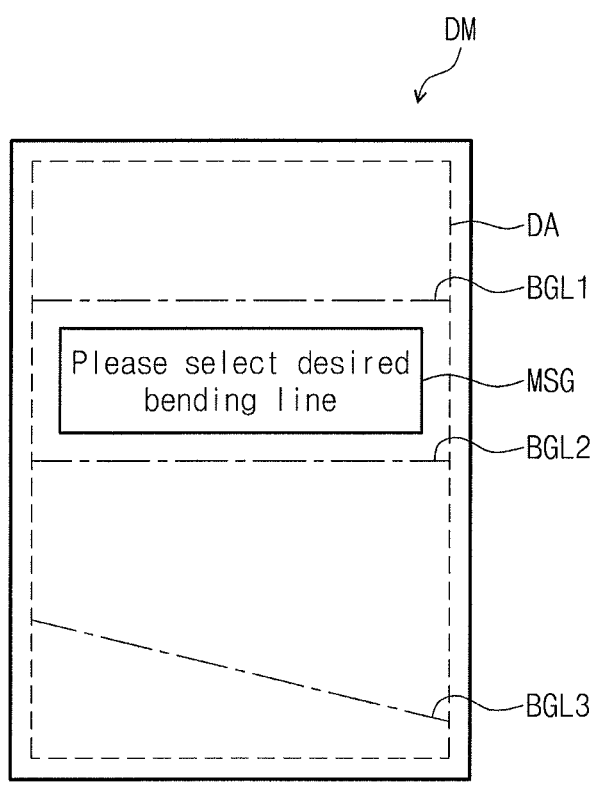

Referring to FIG. 3B, when the user selects area 112 to enter the bending mode, one or more bending guide lines are displayed in the display region DA. In the example shown in FIG. 3B, three bending guide lines BGL1 to BGL3 are displayed. The bending guide lines BGL1 to BGL3 may all extends in a same direction or may extend in different directions. For example, bending guide lines BGL1 and BGL2 extend in parallel in a same direction, and bending guide line BGL3 extends in a direction which crosses the direction of the bending guide lines BGL and BGL2. In FIG. 3B, the bending guide line BGL2 extends diagonally across display region DA. In another embodiment, a bending line may extend vertically across display region DA.

The bending guide lines BGL1 to BGL3 serve as candidate lines subject to selection by a user as a bending line BL, e.g., the display module DM may be selected to bend along any of the bending guide lines BGL1 to BGL3. The bending guide lines may be displayed as an image in the display region DA. Accordingly, a user may easily obtain the information on bendable regions and positions for the display module DM, and easily select a desired position. A guide message MSG may also be displayed in FIG. 3B to prompt the selection of one of the bending guide lines BGL by a user. The message MSG may include content (e.g., text, graphics, icons, etc.) to guide a user to select a bending guide line BGL for purposes of designating a bending line BL.

Figure 3C:
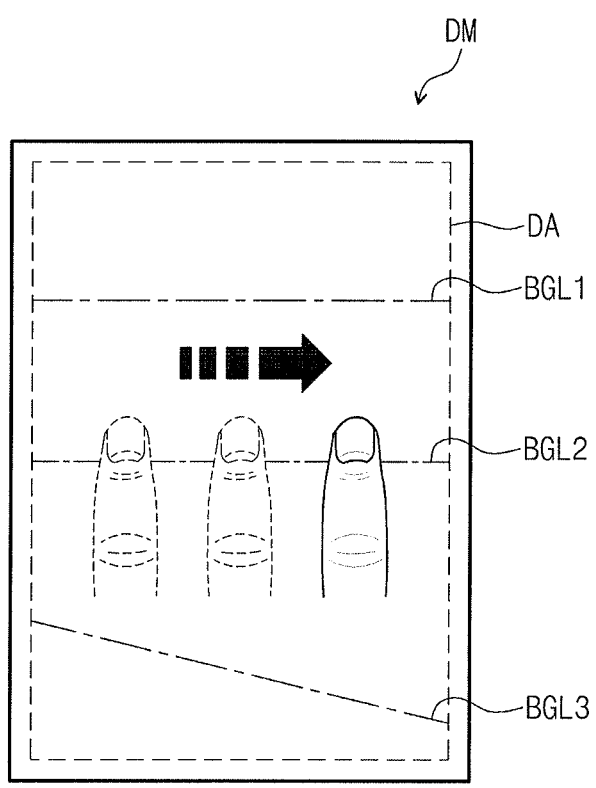

Referring to FIG. 3C, the display module DM receives an input signal selecting one of the bending guide lines BGL as the bending line BL. For example, a user may provide an input signal designating one bending guide line BGL2 from among bending guide lines BGL1 to BGL3. The display module DM sets the bending line BL to correspond to the selected bending guide lines BGL1 to BGL3 (S200), which is bending guide line BGL2 in this example.

The input signal may be, for example, a touch signal. The touch signal may be but is not limited to a drag touch signal. In this case, a user performs a motion which connects a drag touch between a minimum of two points along the bending guide line to be selected, e.g., bending guide line BGL2. The drag touch may continuously progress along bending guide line BGL2 and a corresponding signal may then be provided to the display module DM. In another embodiment, a user may simply touch (e.g., one touch) the bending guide line (e.g., BGL2) to be selected as the bending line BL. The touch signal, or another type of selection signal (e.g., generated using a function or button of the display module DM), may be a different type in another embodiment.

Figure 3D:
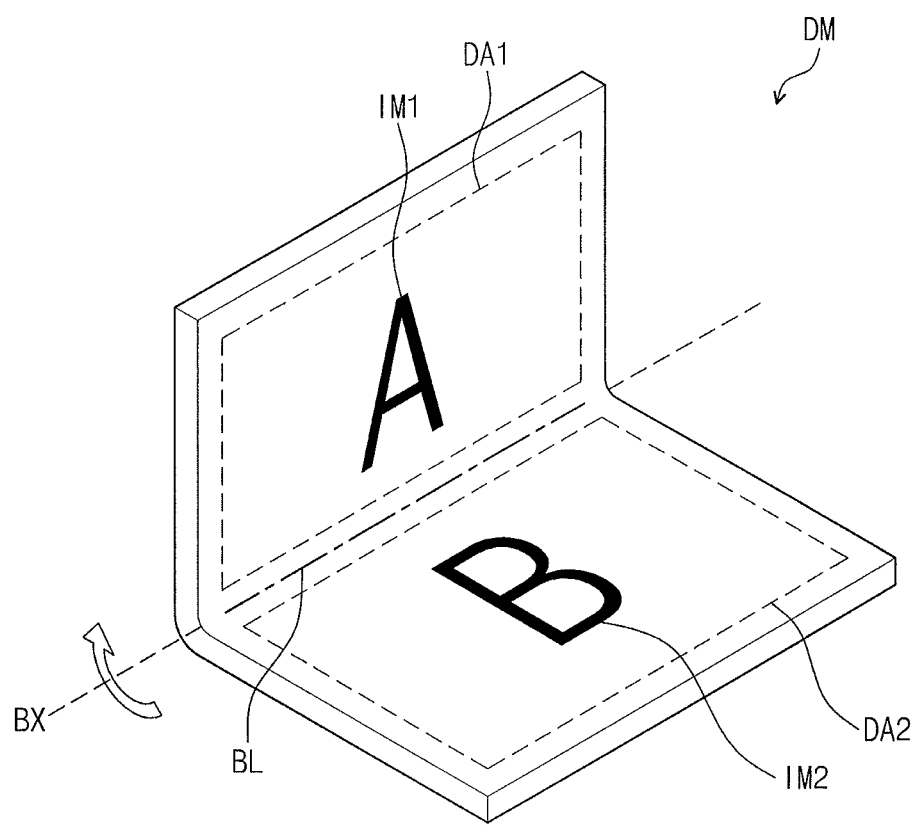

As illustrated in FIG. 3D, when the one bending guide line BGL2 is set as the bending line BL, the display module DM may be bent or folded by a user along the bending line BL (S300). The bending axis BX defined in the display module DM may substantially correspond to the bending line BL.

When the display module is bent or folded, the display region DA includes at least two display regions, e.g., display regions DA1 and DA2 in the example of FIG. 3D. The display regions DA1 and DA2 are divided by the bending line BL, and may operate at the same or different times. The first region DA1 displays a first image IM1 (A) and the second region DA2 displays a second image IM2 (B). The first and second images IM1 and IM2 may contain the same information, information related to each other, or different or independent information. The display module DM may display various information through various methods for the convenience of users.

Figure 4:
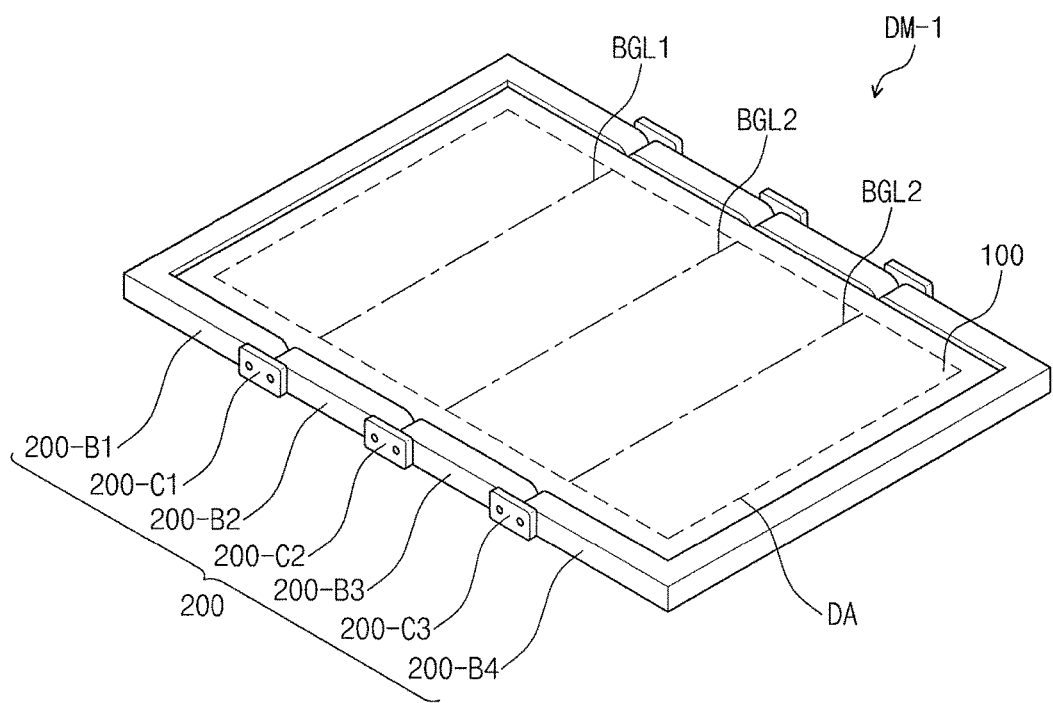
FIG. 4 illustrates an embodiment of a display module.
Figure 5A:
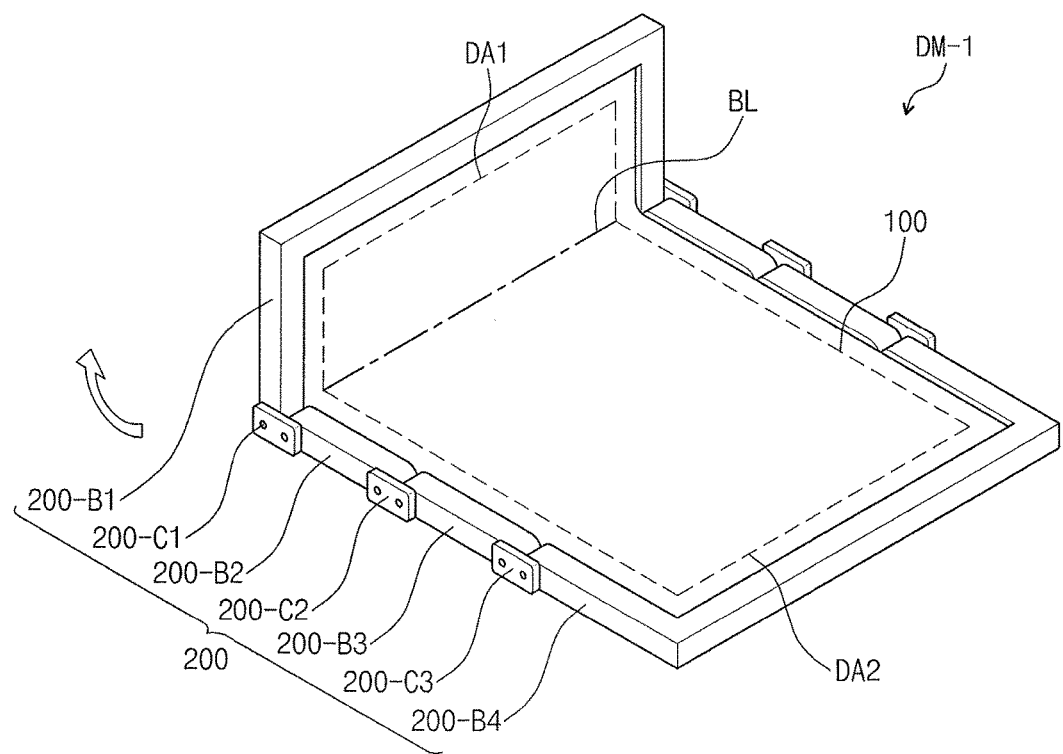
FIGS. 5A-5C illustrate an embodiment of a display module.
Figure 5B:
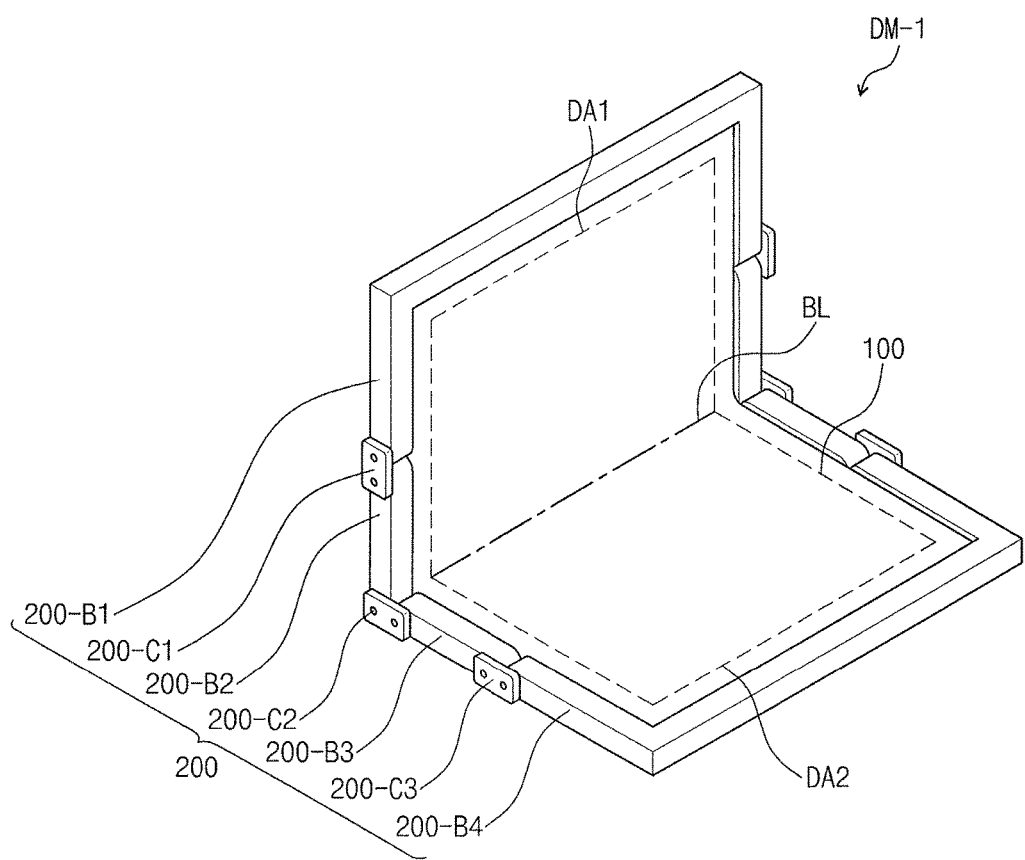
Figure 5C:
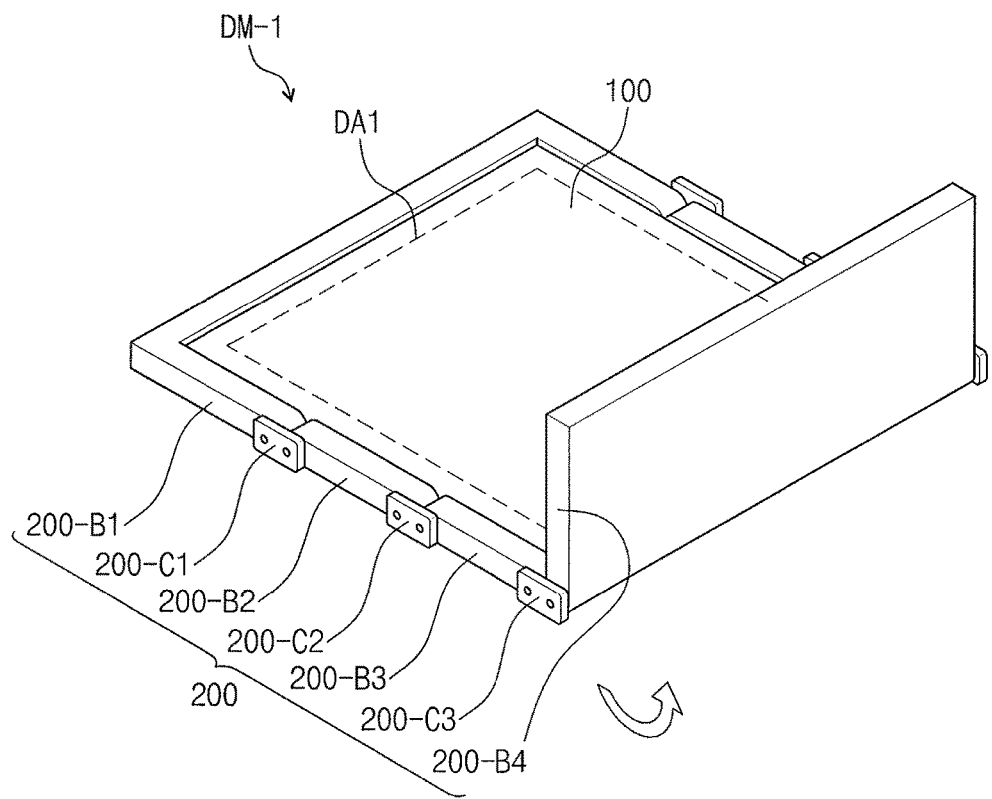

FIG. 4 illustrates another embodiment of a display module DM-1, and FIGS. 5A-5C illustrate different states of the display module DM-1 in bending mode. As illustrated in FIGS. 4 and 5A-5C, the display module DM-1 may be bent in various shapes in bending mode. Operation of the display module DM-1 may be in accordance with any of the aforementioned method embodiments.

The display module DM-1 includes a display part 100 and a bending part 200. The display part 100 displays an image in the display region DA based on various control, data, and driving signals. The display part 100 may be a display panel. The display part 100 includes a substrate, signal lines on the substrate, and pixels electrically connected to the signal lines. The pixels generate images based on the signals from the signal lines.

In one embodiment, the display panel may be a flexible display panel, e.g., an organic light emitting display panel, an electrophoretic display panel, or an electrowetting display panel. Alternatively, the display panel may be a liquid crystal panel that has flexible properties. As with all embodiments disclosed herein, the display part 100 may be bent, folded, rolled, or otherwise manipulated, e.g., to be entirely in a curved surface.

The display part 100 may include a touch sensor for detecting an external touch on the display module DM and for generating a touch signal. The touch signal may include information on the position on which an external touch is provided and/or touch gesture information.

The display part 100 may be formed during a manufacturing process so that bending axes are respectively defined in regions in which the bending guide lines BGL1, BGL2, and BGL3 are displayed. The designing of pixels or a layer structure forming the display part 100 may be implemented in consideration of the regions in which the bending guide lines BGL1, BGL2, and BGL3 are displayed.

The bending part 200 bends the display part 100. In the current embodiment, the bending part 200 may be an accommodating member accommodating the display part 100. The bending part 200 bends the display part 100 along bending line BL.

The bending part 200 includes a plurality of body blocks 200-B1 to 200-B4 and a plurality of connecting blocks 200-C1 to 200-C3. The body blocks 200-B1 to 200-B4 define an inner space for accommodating the display part 100 and stably support a front surface of the display part 100. Body blocks 200-B1 to 200-B4 apply forces to the display part 100 to bend or maintain the shape of the display part 100.

Each of the connecting blocks 200-C1 to 200-C3 connects adjacent ones of the body blocks 200-B1 to 200-B4, respectively. The connecting blocks 200-C1 to 200-C3 may be formed as a pair of blocks spaced apart from and facing each other, with the body blocks 200-B1 to 200-B4 therebetween. In another embodiment, the connecting blocks 200-C1 to 200-C3 may have an integral shape.

The connecting blocks 200-C1 to 200-C3 may respectively overlap the bending axes in the display part 100. Accordingly, the connecting blocks 200-C1 to 200-C3 may respectively overlap lines extending the bending guide lines BGL1, BGL2, and BGL3.

The connecting blocks 200-C1 to 200-C3 may function as hinges. Accordingly, the body blocks 200-B1 to 200-B4 may easily rotate about the connecting blocks 200-C1 to 200-C3, and rotation of the body blocks 200-B1 to 200-B4 may allow the display part 100 to achieve a bent or folded shape.

As illustrated in FIG. 5A, when a first bending guide line BGL1 is selected as the bending line BL, the first body block 200-B1 is rotationally moved about the first connecting block 200-C1. Accordingly, the display part 100 is bent along the bending line BL. In this case, the display region DA of the display module DM-1 is divided into a first region DA1 overlapping the first body block 200-B1 and a second region DA2 overlapping the second body block 200-B2, the third body block 200-B3, and the fourth body block 200-B4. The first region DA1 is smaller than the second region DA2.

As illustrated in FIG. 5B, when the second bending guide line BGL2 is selected as the bending line BL, the first body block 200-B1 and the second body block 200-B2 are rotationally moved about the second connecting block 200-C2. Accordingly, the display part 100 is bent along the bending line BL. Since the display module DM-1 is bent with respect to the selected bending line BL, the first connecting block 200-C1 fixes the first body block 200-B1 and the second body block 200-B2. Accordingly, the first body block 200-B1 and second body block 200-B2 may move like an integral structure.

The display region DA may be divided into a first region DA1 overlapping the first body block 200-B1 and the second body block 200-B2 and a second region DA2 overlapping the third body block 200-B3 and the fourth body block 200-B4. The first and second regions DA1 and DA2 may have substantially the same areas.

As illustrated in FIG. 5C, when the third bending guide line BGL3 is selected as the bending line, the third body block 200-B3 is rotationally moved about the third connecting block 200-C3. Accordingly, the display part 100 is bent along the bending line BL. In this case, the display region DA may be divided into a first region DA1 overlapping the first to third body block 200-B1, 200-B2, and 200-B3 and a second region overlapping the fourth body block 200-B4. The fourth body block 200-B4 may move in substantially the same manner as the first body block 200-B1 in FIG. 5A. In one embodiment, the display module includes a separate accommodating member. The bending part 200 may be disposed at a rear surface of the display part 100 in the accommodating member. For example, the bending part 200 may include an electro-active material for bending the display part 100 according to an electrical signal. In this case, the display part 100 is bent by the bending part, and the accommodating member is manually bent according to the motion of the display part 100.

Figure 6A:
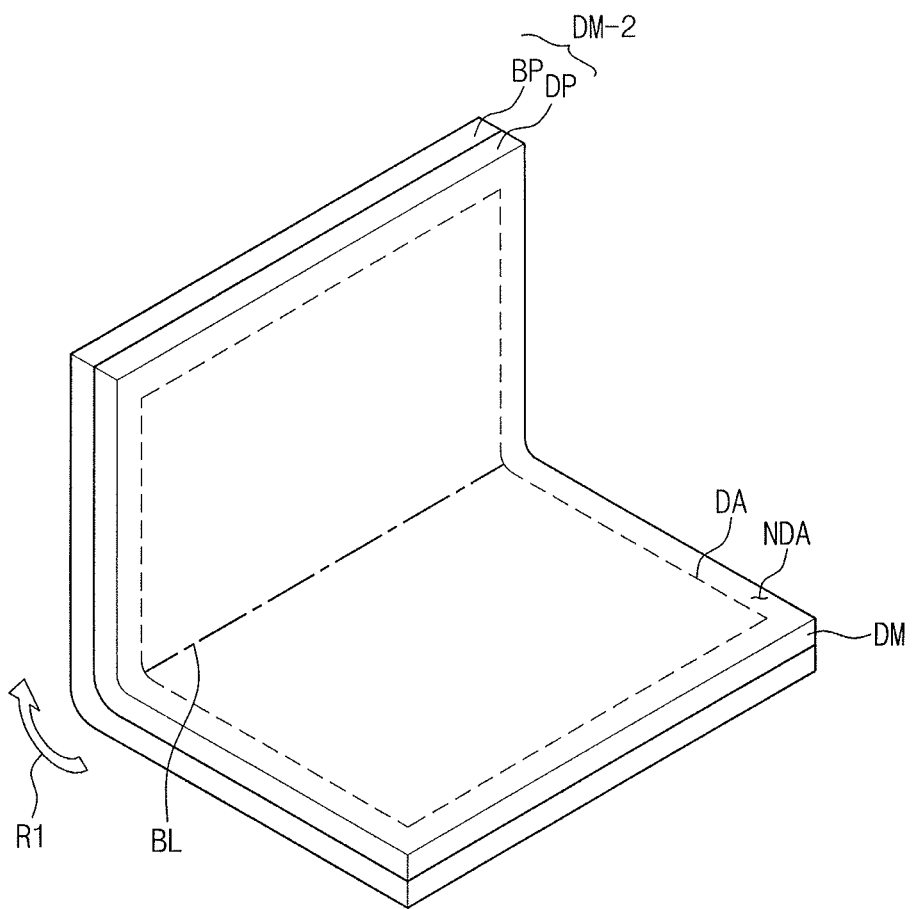
FIGS. 6A and 6B illustrate an embodiment of a display module.
Figure 6B:
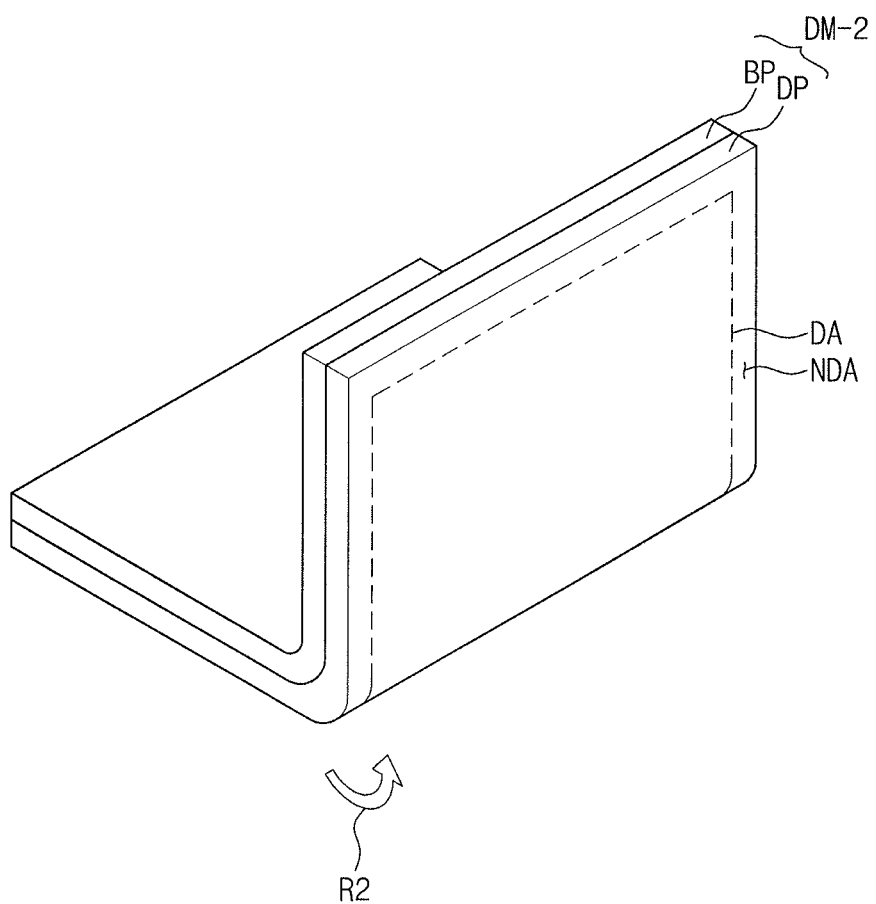

FIGS. 6A and 6B illustrates another embodiment of a display module DM-2 having different bending directions. As illustrated in FIGS. 6A and 6B, the display module DM-2 includes a display part DP and a bending part BP. The display part DP has a front surface which includes a display region DA for displaying images. The display part DP may be a flexible display panel.

The bending part BP may be on a rear surface of the display part DP. The bending part BP receives transformation signals generated from a controller for bending the display part DP. The controller generates the transformation signals corresponding to touch signals. Accordingly, the bending part BP may bend the display part DP according to the touch signals. The controller may be disposed into the display module. Or the controller may be served separately and electrically connected to the display module. The controllers in the other embodiments described herein may be similarly located.

The bending part BP may bend the display part DP through various methods. For example, the bending part BP may transform itself, according to an electrical signal, to bend the display part DP. The bending part BP may include an electro-active material which is pushed or contracted in one direction according to the direction of current. The bending degree and the bending direction of the display part DP may be determined by the transforming force of the bending part BP.

The display module DM-2 may be transformed into various shapes by the bending part BP. For example, as illustrated in FIG. 6A, the display module DM-2 may operate in in-folding mode. In the in-folding mode, the front surface of the display part DP is folded inwardly in a first direction (R1) based on a tensile force of the bending part BP. This force may be applied, for example, when a user pushes the front surface of the bending part. In another embodiment, the force may be applied automatically (without any manual manipulation by a user), for example, based on a touch signal. For example, when the in-folding mode is selected, the bending part BP applies a tensile force in a region overlapping the bending line BL.

As illustrated in FIG. 6B, the display module DM-2 may operate in an out-folded mode. In the out-folding mode, the rear surface of the display part DP is folded outwardly in a second direction (R2) based on a contracting force applied by the bending part BP. This force may be applied, for example, when a user pulls the rear surface of the bending part. In another embodiment, the force may be applied automatically (without any manual manipulation by a user), for example, based on a touch signal. When the out-folding mode is selected, the bending part BP applies a contracting force in a region overlapping the bending line BL.

The determination of the in-folding mode and the out-folding mode may be selected according to various methods. For example, whether to enter into the in-folding mode or the out-folding mode may be determined based on the direction of a touch input. When the bending line BL is selected based on the direction of a touch input (e.g., a dragging touch), the direction of the touch input (e.g., the dragging touch in one direction) may serve as an external touch input signal which causes the display module DM-2 to enter into the in-folding mode based on signals generated by the controller. A touch input in another (e.g., a dragging touch in the opposite) direction may serve as an external touch input signal to cause the display module DM-2 to enter into the out-folding mode based on signals generated by the controller.

In the display module DM-2, a user may control the bending direction of the display module DM-2 through the dragging direction. Accordingly, since the display module DM-2 may be easily controlled through an intuitive input method, the applicability of the display module DM-2 may be improved.

In FIGS. 6A and 6B, the bending line BL is at the center of the display DP. In another embodiment, the bending line BL may be defined in another region of the display part DP, and the bending part BP may bend the display part DP regardless of the position of the bending line BL.

Since the display module DM-2 may bend the display part DP along the bending line BL defined by a user regardless of the position of the bending line BL, user convenience may be improved. Also, since the bending part BP bends the display part DP based on electrical signals, the display module DM-2 may be provided which may be automatically bent, even when a user does not apply a force to bend the display module.

Figure 7A:
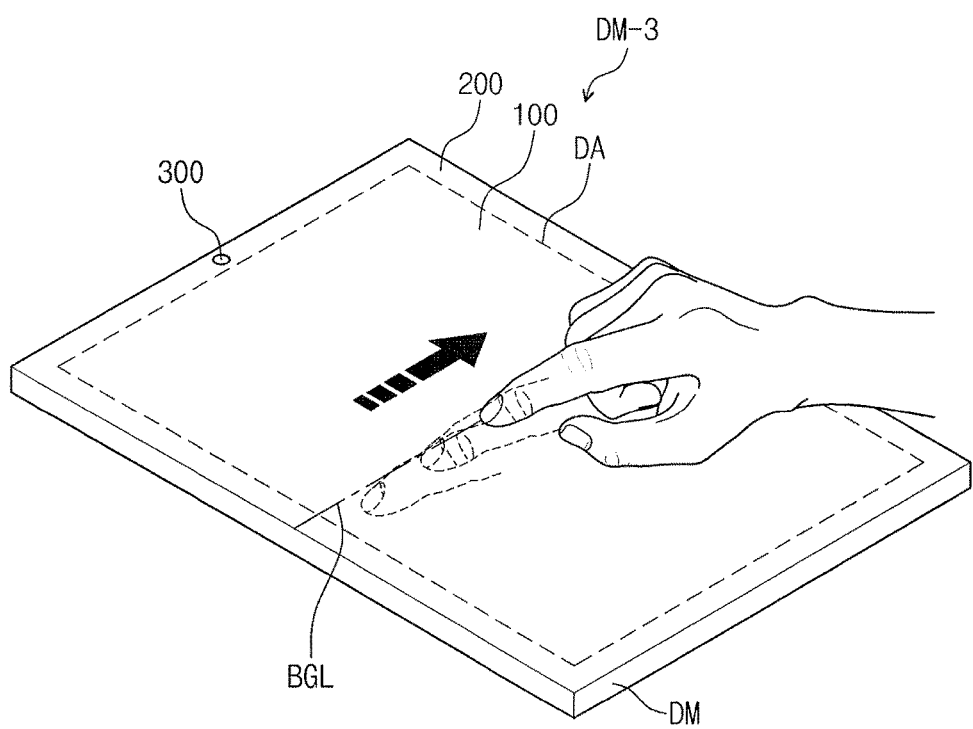
FIGS. 7A and 7B illustrate an embodiment of a display module.
Figure 7B:
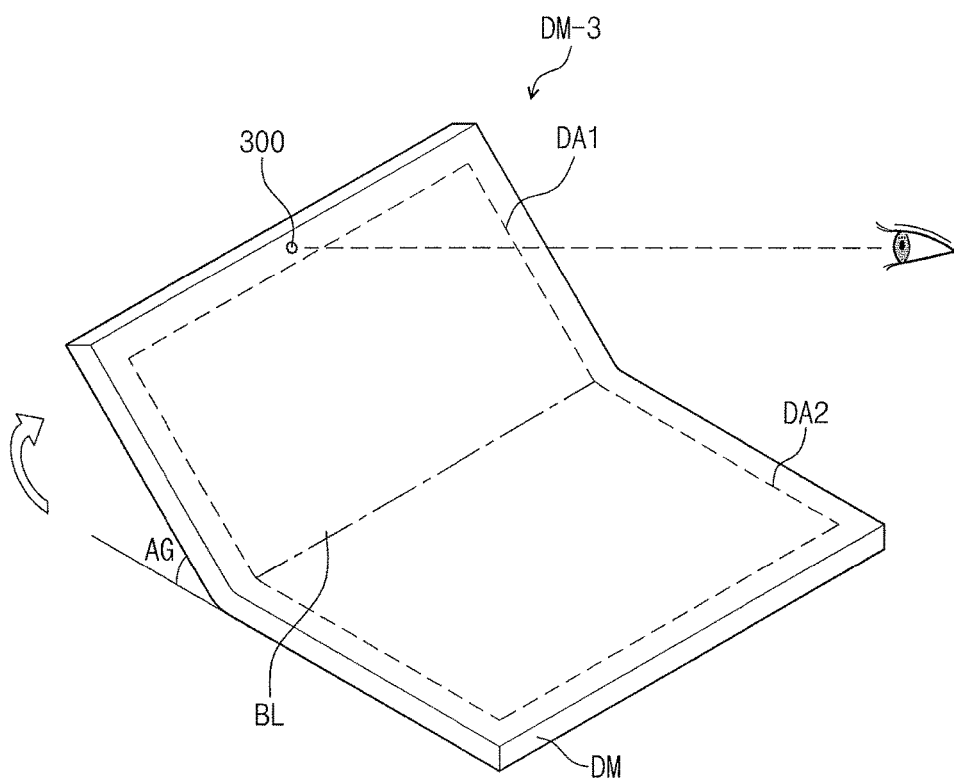

FIGS. 7A and 7B illustrate another embodiment of a display module DM-3 in planar mode and bending mode, respectively. As illustrated in FIG. 7A, the display module DM-3 includes a detector 300 in an accommodating member 200. In another embodiment, the detector 300 may be at another location, e.g., on the display part 100.

The detector 300 detects the position of a subject and provides a position signal to a controller. The position signal includes position information on the subject. The position information may include user view information. For example, the detection part 300 may track user view information in the form of the position of the pupil in the eye of a user. The detector 300 may be, for example, a camera or an infrared detector. The detector 300 detects the position of a user's view and provides a position signal including user view information to the controller.

The display module DM-3 provides a touch signal, corresponding to a bending guide line selected as a bending line BL, to the controller. The display module DM-3 is bent about the bending line BL by a predetermined bending angle AG. The bending angle AG may be determined, for example, based on the position information of the subject. The controller receives the position signal from the detector 300 and generates a control signal to control the bending degree of the display part 100.

The display module DM-3 may be bent based on the user view information. The display module DM-3 detects the position of the user's view through the detector 300 and adjusts the bending angle AG so that the display region DA is positioned within the user's view. Accordingly, the display module DM-3 may be bent to have a viewing angle suitable to user.

The bending angle AG may be about 90 degrees or less. When the bending angle is about 90 degrees or more, it may not be easy to display an image to a user in all cases. However, it may be easy to store the display module by fully folding the display module or the size of the display region DA may be reduced. In the current embodiment, when the display module DM-3 detects view information for a user, the bending angle AG may be controlled to be within the angle range of about 90 degrees or less to provide an image suitable to the user's position.

Figure 9A:
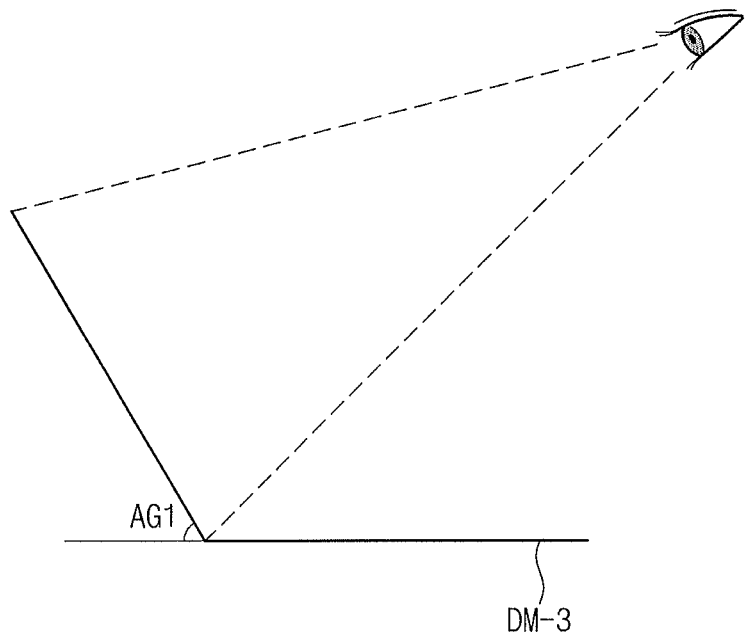
FIGS. 9A and 9B illustrate example operations of the method in FIG. 8.
Figure 9B:
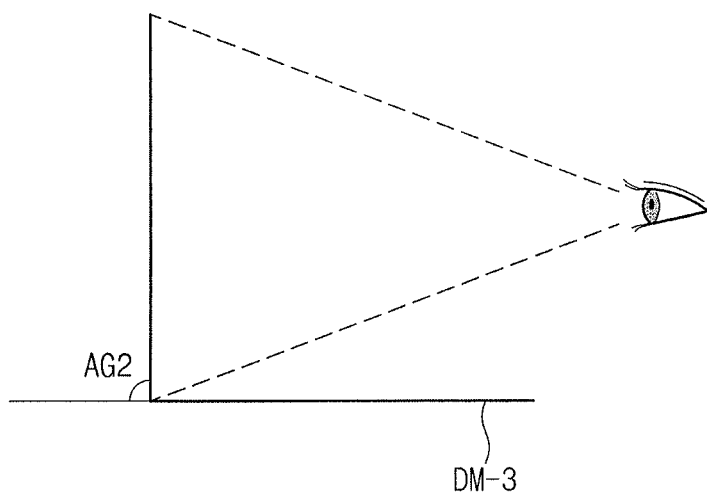

FIG. 8 illustrates another embodiment of a method for controlling a display module, which, for example, may be display module DM-3. FIGS. 9A and 9B illustrate examples of operations for controlling the bending angle AG of the display module DM-2 based on different viewer angles.

As illustrated in FIG. 8, a method includes selecting whether to perform a bending mode (S400). Here, the display module DM-3 may display a guide screen asking whether to perform a bending mode in the display region DA. When the bending mode is selected, the display module DM-3 performs additional steps for setting a specific bending operation. When the bending mode is not selected, the display part is operated (S500) to display an image in the display region DA. A user may bend the display module DM-3 or operate the same in a planar state according to the selection.

Referring to FIG. 8, the bending region or line may be activated (S300, see FIG. 2) and the display region DA divided into a plurality of areas. For example, after the bending region is line is activated, the method may proceed to determining whether to select an automatic mode (S31).

When the automatic mode is selected, the display module DM-3 proceeds to adjusting the bending angle automatically (S32A). Here, the detector 300 is turned on to detect a user view position. The controller provides a bending signal to bend a display part 100 by a bending part, so that the detection part 300 may detect the user view position. For example, when the user view position is detected by the detector 300, the detector 300 provides user view information to the controller. The controller stops transmission of the bending signal or transmits a bending signal which leads the display part to be bent at a relatively slow speed.

When the user view position corresponds to a predetermined value which has been previously input, the bending operation stops. At this time, the bending angle AG is set. The predetermined value previously input may be a value which is set, such that the user view position is at a predetermined location (e.g. the center) of a first region DA1 (sec FIG. 7B) which is a portion to be bent in the display region.

Accordingly, as illustrated in FIG. 9A, when the user view position is detected as a relatively high position (e.g., above a first predetermined angle), the bending angle AG1 of the display module DM-3 may be a relatively low angle (a first range of angles). As illustrated in FIG. 9B, when the user view position is detected as a relatively low position (below the first predetermined angle or below a second predetermined angle lower than the first predetermined angle), the bending angle AG2 of the display module DM-3 may be a relatively high angle (e.g., in a second range of angles above the first range of angles).

When the user view position is high, the bending angle AG1 of the display module DM-3 is lower than the bending angle AG2 of the display module DM-3 when the user view position is low. After the bending angle is set, the display part is operated (S500) and the display module DM-3 displays an image. Accordingly, a user may view an image at various positions regardless of the viewing position.

In one embodiment, the display module DM-3 automatically provides the bending angle AG corresponding to user viewing position information, so that user convenience may be improved. Alternatively, the display module DM-3 may enter into a manual mode according to a user selection. When not entering into automatic mode in determining whether to select an automatic mode (S31), a user may arbitrarily bend the display module DM-3 at a desired angle through manual adjustment (S32B).

In accordance with one or ore of the aforementioned embodiments, a bending line along which a display module is to be bent may be set according to a user selection. For example, the display module displays at least one bending guide line and the user selects one bending guide line as the bending line. The display module is bent along the selected bending guide line. Accordingly, the convenience of operating the display module may be improved. Also, since the bending regions may be changed according to a user selection, user convenience may be improved. Also, the bending angle of the display module may be controlled according to a user position. Thus, users may be able to view images at optimal viewing angles based on their positions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controller of the aforementioned embodiments may be implemented in logic which, for example, may include hardware, software, or both. When implemented at least partially in hardware, the controller may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controller may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A display module, comprising:
   a display panel including a display region and a non-display region, the display region to display a plurality of bending guide lines and an image, the display region defined in a plan view in the display panel, the display panel is flexible; and
   a bending part to apply a force to bend the display panel along a bending line so that each of the display region and the non-display region of the display panel is bent along the bending line, wherein the bending line is to correspond to the bending guide line when the bending guide line is selected based on an input signal, and wherein:
   the input signal is generated based on a user selection, and
   when the display panel is bent, the bending guide lines except for the selected bending guide line are not to be displayed.

2. The display module as claimed in claim 1, wherein the input signal is a touch input signal to be generated based on a touch on the display panel.

3. The display module as claimed in claim 2, wherein the touch input signal is to be generated when the touch is on one point of the selected bending guide line.

4. The display module as claimed in claim 2, wherein the touch input signal is to be generated based on a continuous touch applied between at least two points in the selected bending guide line.

5. The display module as claimed in claim 4, wherein the touch is a dragging touch applied along a line connecting the at least two points.

6. The display module as claimed in claim 5, wherein:
the at least two points include a first point and a second point,
the display panel has a front surface which includes the display area and the non-display area and a lower surface opposing to the front surface,
the display panel is bends in a first direction so that the front surface of the display panel bends along the bending line when a direction of the touch input is from a first point to a second point,
the display panel bends in a second direction so that the lower surface of the display panel bends along the bending line when the direction of the touch input is from the second point to the first point, and
the first direction is opposite to the second direction.

7. The display module as claimed in claim 1, wherein the bending guide lines include at least two bending guide lines extending in different directions crossing each other.

8. The display module as claimed in claim 1, wherein the bending part includes an electro-active material.

9. The display module as claimed in claim 8, further comprising: an accommodation member to accommodate the display panel and the bending part and to expose the display region.

10. The display module as claimed in claim 1, wherein:
the bending part is to accommodate the display panel, and
the bending part includes at least one bending axis corresponding to the at least one bending guide line.

11. The display module as claimed in claim 1, further comprising:
a detector to detect a position of a subject, wherein the bending part is to bend the display region and the non-display region of the display panel at a bending angle corresponding to the position of the subject.

12. The display module as claimed in claim 11, wherein the detector includes a camera or an infrared detector.

13. A method of controlling a display module, comprising:
selecting one bending guide line among a plurality of bending guide lines displayed in a display region of the display module as a bending line;
activating a bending region that overlaps the bending line; and
applying a force to bend the display module along the bending line so that each of the display region and a non-display region of the display module is bent along the bending line, wherein, when the display module is bent, the bending guide lines except for the selected bending guide line are not to be displayed.

14. The method as claimed in claim 13, wherein selecting the bending guide line is performed based on a touch signal.

15. The method as claimed in claim 14, wherein the touch signal is a dragging touch signal.

16. The method as claimed in claim 13, wherein activating the bending region includes adjusting a bending angle of the display region and the non-display region of the display module.

17. The method as claimed in claim 16, wherein adjusting the bending angle includes:
turning on a detector to detect position information of a subject;
bending the display region and the non-display region of the display module based on the position information; and
setting the bending angle so that when the position information on the subject corresponds to a predetermined value, bending of the display region and the non-display region of the display module is completed.

18. The method as claimed in claim 17, wherein the predetermined value is a value set to position the subject at a center of a bent portion of the display region.

19. The method as claimed in claim 17, wherein the bending angle is about 90 degrees or less.

* * * * *